United States Patent [19]

Pettit

[11] 3,998,359
[45] Dec. 21, 1976

[54] TRANSPIRATION COOLING SYSTEM HAVING AN EXPULSION BLADDER

[75] Inventor: Ernest M. Pettit, Huntington Beach, Calif.

[73] Assignee: McDonnell Douglas Corporation, Long Beach, Calif.

[22] Filed: Feb. 4, 1975

[21] Appl. No.: 547,038

[52] U.S. Cl. .................................. 222/3; 222/386.5
[51] Int. Cl.² .......................................... B67D 5/40
[58] Field of Search ............... 222/95, 386.5, 3, 5

[56] References Cited

UNITED STATES PATENTS

| | | | |
|---|---|---|---|
| 2,980,177 | 4/1961 | Glasson | 222/386.5 |
| 3,067,810 | 11/1962 | Mozic | 222/386.5 |
| 3,319,420 | 5/1967 | Mercier | 222/386.5 X |
| 3,731,843 | 5/1973 | Anderson, Jr. | 222/386.5 |
| 3,836,170 | 9/1974 | Grosch et al. | 222/5 |
| 3,847,310 | 11/1974 | Rabe | 222/386.5 |

Primary Examiner—Allen N. Knowles
Assistant Examiner—Hadd Lane
Attorney, Agent, or Firm—John P. Scholl; Walter J. Jason; Donald L. Royer

[57] ABSTRACT

A transpiration cooling system having a conical expulsion bladder for cooling conical re-entry vehicles and other uses. The bladder is of high temperature resistant elastomeric materials such as fabric impregnated silicones and carboxynitroso rubber attached to a housing by a circumferential bead. A transpiration coolant is on one side of the bladder and a source of expansive gases on the other. As the gases expand, the bladder pressures the fluid to move to the tip of the re-entry vehicle where it bleeds off to cool the vehicle on re-entry.

8 Claims, 4 Drawing Figures

TRANSPIRATION COOLING SYSTEM HAVING AN EXPULSION BLADDER

BACKGROUND OF THE PRESENT INVENTION

Transpiration is the act of excreting a liquid, vapor, or gas through a surface as a means of cooling the surface. This type of thermal protection is particularly desirable in a high heat environment such as is experienced by nose cones for re-entry vehicles, missile leading edges and nose tips, rocket nozzles and combustion chamber linings, steam and gas turbine blades, and instruments exposed to a high heat flux.

As an aircraft body exceeds supersonic speed it approaches a complex atmospheric condition wherein considerable heat conditions are imposed upon the craft sufficient to rapidly melt, and/or vaporize most known materials at an extremely rapid rate similar to the burning and destruction of meteors. This may occur in atmospheric flight, leaving or re-entering the atmosphere. Missiles re-entering the atmosphere at very high velocity are decelerated by pressure and frictional resistance and the nose portion of such missiles is subjected to intense heating.

One solution for protecting missiles during re-entry is the use of a heat shield which insulates the forward portion of the vehicle from severe heating by partial ablation, re-radiation, and absorption. Another approach is to circulate a coolant through passageways adjacent the most severely heated portions of the craft and then ejecting this coolant from the vehicle through porous, external elements for further cooling the heated portions. Coolant thus ejected by transpiration through the porous material provides cooling during evaporation of the coolant and by the formation of a boundary of vaporized coolant for shielding the external surfaces from adjacent, superheated, gaseous flow.

In the past coolant has been stored in a container in the vehicle and pumped, when needed, to the heated, external surface of the vehicle. Such control systems, pumps, and the like, add undesirable complexity and weight to the cooling system and are subject to possible malfunction or failure under stress.

SUMMARY OF THE PRESENT INVENTION

The present invention utilizes an elastomeric expulsion bladder separating a coolant fluid supply and a pressurization source, such as a solid gas generator or similar device. Hot gas from the generator pressurizes the fluid through the bladder and a valving system beyond the exit port distributes the coolant on command. The exit port is a combination of small holes and grooves which are capable of accommodating the required flow with predictable pressure drop but which are capable of supporting the bladder in the pressurized condition. This support precludes bladder damage.

The bladder is made to fit the coolant reservoir when extended by gas pressure and to collapse over the hot gas port when a vacuum is applied through the port and the reservoir is filled with coolant fluid. When applied to a conical shape reservoir, the bladder is shaped as a truncated cone with its base circumference sealed about the periphery of the reservoir inner wall.

The hot gas port expander/deflector protects the bladder from some directions better than others. During operation hot gas enters the port from the gas generator chamber and expands and cools before it is deflected from direct impingement on the elastomeric bladder. This design may be modified to suit special needs.

A very high expulsion volumetric efficiency can be obtained which is not possible when a cylindrical device, such as a pump, is used in which there is wasted space. Also, with any metallic device, ullage space is required to allow for fluid expulsion during temperature changes.

The elastomeric bladder in the present invention provides for ground system test and re-test by pressurization of the system with cold gas since the elastomeric material will not crack or fatigue. This is not possible with metallic bladders since they are usable only once. In fact, they cannot be tested for a complete cycle before installation in a vehicle. Elastomeric bladders are less expensive than metallic units to develop and produce, and modifications in contour and construction may be made to the elastomeric units quickly and cheaply. The latter is not true with metallic units. In many systems (in fact, most systems) it is important that the fluid being expelled by the pressure generating device remains relatively cool. The elastomeric bladder does this by inherent insulating properties. Consequently, the bladder shields the fluid from the hot combustion products of the gas generator. This is not so with a metallic type bladder. The metallic bladder would require some insulating material to be bonded or in some way fixed to the metallic bladder. In systems involving water and the storage of water for long periods, it is important that the water be shielded from metal to preclude corrosion. The elastomeric explusion device affords this protection. If a metallic expulsion bladder were used in this type of installation it would be necessary to bond some non-corroding material to the metal and inspection would add further cost. On some installations in which stainless steel has been involved, corrosion occurred on the stainless steel after months of storage. The fact that elastomeric bladders (or diaphragms) may be collapsed by vacuum and the fluid chamber completely filled gives maximum use of the fluid chamber. Actually 95 percent volumetric efficiency has been demonstrated. The elastomeric material is capable of accommodating thermal variation without fatigue. This is not possible with metallic units. Ullage must be provided when metal bladders are used.

A further advantage involves a reduction in system shock loads. When charging pressure is generated (by a gas generator or compressed gas) the pressure is transmitted to the system with little shock as compared to the collapse of a large ullage bubble which is required to preclude fatigue of metal bladders or diaphragms caused by thermal changes.

Another advantage of the use of elastomeric materials for this application lies in material optimization during bladder construction. It is easy to fabricate expulsion bladders with high temperature resistant materials on the hot side and system fluid resistance on the fluid side. They also have the capability to mold into the bladder extra thickness in regions of high temperature and/or stress. The flexibility of bladder construction permits various cover and/or reinforcement materials to customize the bladder to its installation.

DETAILED DESCRIPTION OF ILLUSTRATIVE EMBODIMENTS

Figure 1:
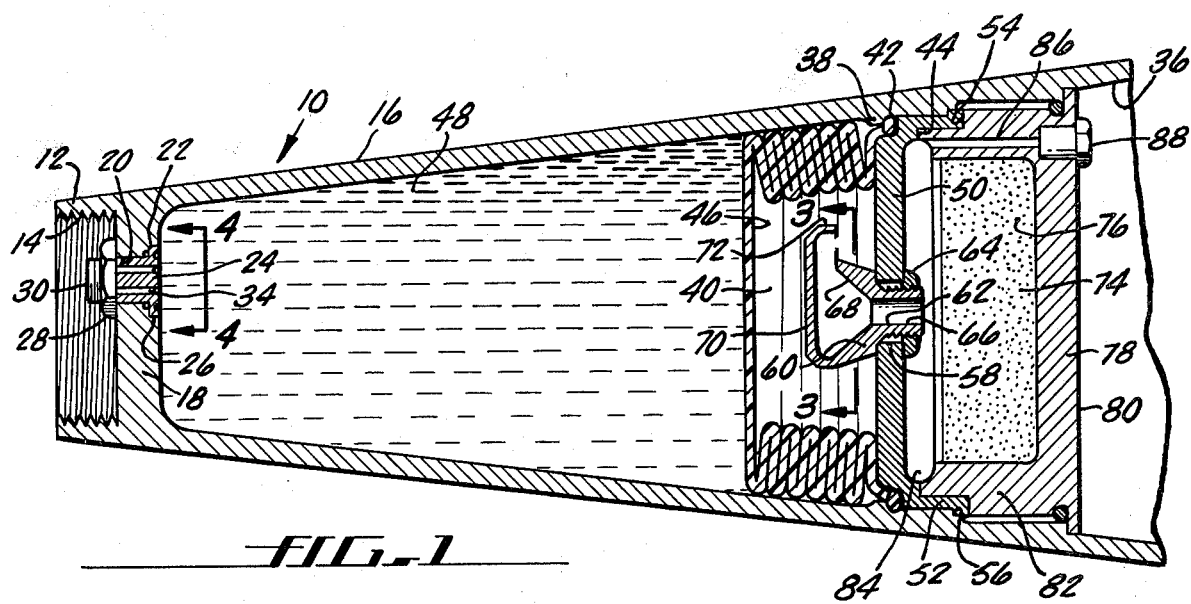
FIG. 1 is a sectional view taken along the axis of a conical vehicle housing the solid gas generator/elastomeric expulsion system with the bladder in collapsed position.
Figure 2:
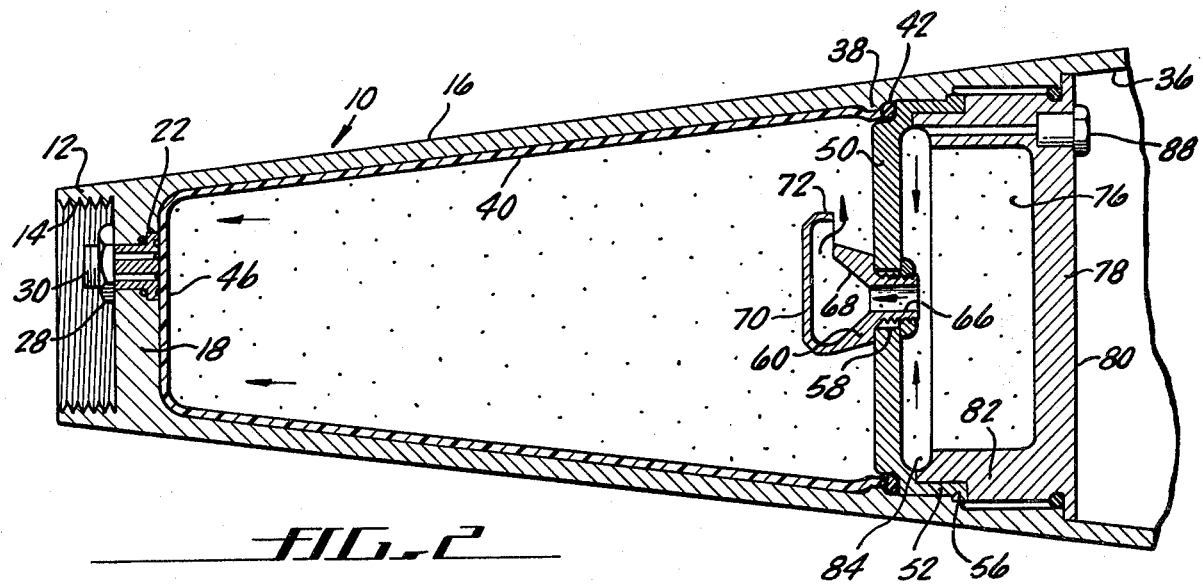
FIG. 2 is a sectional view similar to that in FIG. 1 but with the bladder extended.

Referring now to FIGS. 1 and 2, there is shown the nose section 10 of a re-entry vehicle having a need for transpiration cooling. A nose tip, not shown, fastens to the smaller front end 12, such as by mating with internal threads 14, for example. This nose tip may have a porous surface through which coolant may pass to cool the nose section. Also, appropriate valve controls in the nose tip regulate coolant flow in response to heat sensors or other command signals. Since these features are conventional and may be used by those skilled in the art, no further description is deemed necessary. They illustrate an end use of the coolant fluid pressurized and expelled in accordance with the present invention.

The nose section 10 has a truncated conical wall 16 terminating in a forward end wall 18. This end wall has a bore 20 with an enlarged shoulder 22 at its rearward end into which is mounted an expulsion port 24. This port has a flange 26 which abuts shoulder 22 to prevent its outward removal. A nut 28 is threaded over the outward protruding end 30 of port 24 and seats against the outer face 32 of end wall 18 to secure the port against inward removal. Port 24 has a plurality of apertures 34 extending therethrough for the passage of fluid through the forward end wall 18.

Near the enlarged rearward end 36 of the conical wall 16 and extending from its inner surface is an inwardly directed peripheral ridge 38. An expulsion elastomeric bladder 40 has its peripheral edge 42 bearing against this ridge and is held in sealed relation thereto by a bulkhead 44. This bladder 40 is shown in collapsed condition in FIG. 1 and its end 46 forms a movable wall for a coolant reservoir 48 which is within conical wall 16 and rearwardly of the forward end wall 18. Bulkhead 44 consists of a flat circular plate 50 having an annular rearwardly extending rim 52 fitting within conical wall 16. An outwardly extending annular flange 54 on rim 52 enages a recess 56 in wall 16 to limit forward movement of the bulkhead 44, particularly when the hot gas generator is functioning.

Figure 3:
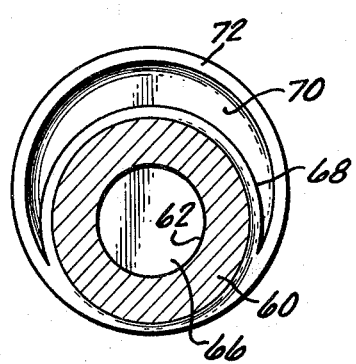
FIG. 3 is a view of the hot gas deflector taken along the line 3—3 of FIG. 1.

Bulkhead 50 has an opening 58 into which a hot gas port and deflector 60 is mounted. This deflector 60 has a tubular wall 62 extending through opening 58 and held by a nut 64 threadedly mounted thereover and bearing against the bulkhead plate 50. This tubular wall has a central opening 66 through which expanding gases pass. As can be seen in FIGS. 1 and 3, deflector 60 has funnel-shaped walls 68 extending forwardly of bulkhead plate 50. A portion of the forward edge of walls 68 extends further forwardly to retain a deflector baffle 70 in the path of the hot gases passing through opening 66. These gases are thus deflected by the baffle and pass between the deflector baffle 70 and the funnel-shaped walls 68. A rearwardly extending lip 72 on baffle 70 additionally deflects the gases before they impinge upon the bladder 40 and move it forwardly to its expulsion position shown in FIG. 2.

Located rearwardly and spaced from bulkhead plate 50 is a solid gas generator 74 contained in a cavity 76 in a housing 78. This generator consists of well known chemicals, such as polybutadiene and ammonium nitrate, for example, which, when ignited, generates expansive gases, building up pressure to move the bladder 40 from its collapsed position in FIG. 1 to its extended expulsion position in FIG. 2. The generator housing 78 includes a circular end cover 80 fitting within a conical wall 16. This cover has forwardly extending peripheral wall 82 which fits within conical wall 16 and also within rim 52 of bulkhead 44 to maintain a space 84 between bulkhead plate 50 and gas generator 74. This space 84 provides a path for hot gas flow to the central opening 66 of deflector 60. Also communicating with this space 84 through conduit 86 is a vacuum port 88 which may be used to evacuate and collapse bladder 40 and to charge the space in reservoir 48, thus created, with coolant fluid through apertures 34 in port 24.

Figure 4:
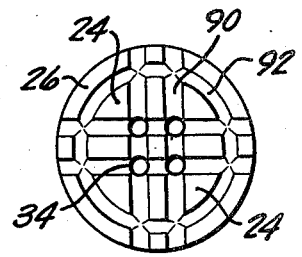
FIG. 4 is an end view of the expulsion port taken along the line 4—4 in FIG. 1.

Bladder 40 preferably is a fabric reinforcement, either elastomeric or metallic, such as nylon or stainless steel, with an elastomeric thermal barrier on the inside for extra thermal protection and a gas and liquid barrier on the outer surface. The thermal barrier also may be an elastomeric material such as fluorocarbon with a vacuum-deposited reflective coating of metal such as gold for heat insulation. The gas and liquid barrier typically is a fluorocarbon or butyl material. The bladder should have predictable collapsing and expansion patterns and preferably not stretch the bladder when in the expanded position shown in FIG. 2. This may be assured by molded convolutions or ribs incorporated into the bladder probably during the fabrication process. A number of contours are possible depending upon the reservoir shape. The bladder should not trap fluid, during the expulsion cycle, by plugging the exit port 24. Port 24 on its inner surface has radial and peripheral grooves 90, 92 communicating with apertures 34, as shown in FIG. 4. This insures support for the bladder end 46, as shown in FIG. 2, while insuring full expulsion of coolant without plugging of the port.

In operation, the system is charged with fluid by filling the reservoir 48 through the expulsion port 24 (or equivalent) while applying a vacuum to the inside of the bladder 40. When pressure and flow is required, the gas generator 74 is ignited and gas flows to the inside of the bladder through the hot gas port deflector 60. Fluid is pressurized and flows out the exit port 24 to the control valve portion of the system, not shown, in response to system demands.

The elastomeric bladder-solid gas generator system just described has a prime use in transpiration cooling in re-entry vehicles where the shape is conical and space is critical. It may also be used to great advantage on tactical missiles to generate high pressure hydraulic fluid for missile control or to generate high pressure fluids for secondary injection in the nozzle or for jet interaction. This system has the capability of long term storage as well as quick response operation of ground or airborne equipment. Cold gas can be substituted as the pressurizing means in testing the system.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. A system for pressurizing a working fluid comprising:
   a truncated conical reservoir having a smaller forward end with an expulsion port therein;
   a truncated conical elastomeric expulsion bladder over the larger rearward end of said reservoir to contain said working fluid in said reservoir;
   said bladder being about the same size and shape as said reservoir when not under pressure and adapted to collapse at said larger end to provide maximum fluid volume in said reservoir and to extend under pressure toward said smaller end to push said fluid through said expulsion port; and
   pressure means subjecting said bladder to pressure from rearward end.

2. A system for pressurizing a working fluid as in claim 1,
   said pressure means comprising a gas generator for generating expanding gases, an end cover sealing said larger end from gas leakage, said end cover having a forwardly directed peripheral wall defining a cavity within which said gas generator is positioned.

3. A system for pressurizing a working fluid as in claim 2,
   said end cover having a vacuum port therein communicating with said bladder through a conduit in said peripheral wall to collapse said bladder at said larger end and to assist in filling said reservoir with fluid.

4. A system for pressurizing a working fluid as in claim 1,
   conical walls extending rearwardly of said reservoir;
   a bulkhead plate positioned rearwardly of said bladder, said plate having an annular flange abutting the inner surface of said conical walls, said plate having an opening therein through which gases from said generator pass to pressurize and extend said bladder.

5. A system for pressurizing a working fluid as in claim 4, said opening in said plate having a hot gas port and deflector therein, said deflector having funnel-shaped walls extending forwardly of said plate, and a deflector baffle extending from said walls to shield said bladder from direct impingement by gasses from said gas generator.

6. A system for pressurizing a working fluid as in claim 5 wherein said deflector baffle has a rearwardly extending lip thereon.

7. A system for pressurizing a working fluid as in claim 1 wherein said expulsion port has a plurality of radial and circumferential grooves on the inner face thereof to prevent said bladder from plugging up said port when said bladder is in its extended position.

8. A system for pressurizing a working fluid comprising:
   a truncated conical reservoir having a smaller forward end with an expulsion port therein;
   a truncated conical elastomeric expulsion bladder over the larger rearward end of said reservoir to contain said working fluid in said reservoir;
   said bladder being about the same size and shape as said reservoir when not under pressure and adapted to collapse at said larger end to provide maximum fluid volume in said reservoir and to extend under pressure toward said smaller end to push said fluid to said expulsion port;
   conical walls extending rearwardly of said reservoir;
   a bulkhead plate positioned rearwardly of said bladder, said plate having an annular flange abutting the inner surface of said conical walls, said plate having an opening therein;
   a gas generator for generating expanding gases located rearwardly of said plate so that the expanding gases pass through said opening in said plate to pressurize the rearward end of said bladder;
   a deflector positioned in said opening in said plate, said deflector having funnel-shaped walls extending forwardly of said plate, and a deflector baffle extending from said walls to shield said bladder from direct impingement by gases from said gas generator, said deflector having a tubular wall inserted through said opening in said plate; and
   a nut to threadedly engage the said tubular wall of said deflector and bear against said plate holding said deflector in position in said plate.

\* \* \* \* \*